United States Patent
Fu et al.

(10) Patent No.: US 10,740,871 B2
(45) Date of Patent: Aug. 11, 2020

(54) IMAGE STABILIZATION METHOD AND ELECTRONIC DEVICE USING THE IMAGE STABILIZATION METHOD

(71) Applicant: ASUSTeK COMPUTER INC., Taipei (TW)

(72) Inventors: Yuan-Te Fu, Taipei (TW); Ming-Huei Tsai, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 22 days.

(21) Appl. No.: 15/609,025

(22) Filed: May 31, 2017

(65) Prior Publication Data
US 2017/0352129 A1    Dec. 7, 2017

(30) Foreign Application Priority Data
Jun. 6, 2016  (CN) ........................ 2016 1 0395537

(51) Int. Cl.
*G06T 3/20* (2006.01)
*H04N 5/232* (2006.01)
(Continued)

(52) U.S. Cl.
CPC .............. *G06T 3/20* (2013.01); *B60K 35/00* (2013.01); *G09G 3/20* (2013.01);
(Continued)

(58) Field of Classification Search
CPC .......... G06T 19/006; G02B 2027/0187; G02B 27/0093; G02B 27/0179; G06F 3/013;
(Continued)

(56) References Cited

U.S. PATENT DOCUMENTS

| 7,903,166 B2 | 3/2011 | Daly |
| 8,653,961 B2 | 2/2014 | Kumon |

(Continued)

FOREIGN PATENT DOCUMENTS

| CN | 101933082 | 12/2010 |
| CN | 102819403 | 12/2012 |

(Continued)

OTHER PUBLICATIONS

"Search Report of Europe Counterpart Application", dated Oct. 23, 2017, p. 1-p. 8.

(Continued)

*Primary Examiner* — Jeffrey J Chow
(74) *Attorney, Agent, or Firm* — JCIPRNET

(57) ABSTRACT

An image stabilization method adapted to an electronic device is provided. The electronic device includes at least a display and at least a connection interface. The connection interface is connected to the detector. The detector is configured to detect environmental information. The image stabilization method comprises receiving a detecting signal from the detector; and performing an image stabilization procedure corresponding to a visual dislocation event according to the detecting signal. The visual dislocation event refers to a change of the relative position between the viewer and the display from a first position to a second position. An electronic device using the image stabilization method is also provided.

8 Claims, 8 Drawing Sheets

(51) Int. Cl.
*G09G 3/20* (2006.01)
*B60K 35/00* (2006.01)
*G06F 3/01* (2006.01)

(52) U.S. Cl.
CPC ... *H04N 5/23267* (2013.01); *B60K 2370/152* (2019.05); *B60K 2370/52* (2019.05); *B60K 2370/589* (2019.05); *G06F 3/013* (2013.01); *G09G 2320/0261* (2013.01); *G09G 2340/0464* (2013.01); *G09G 2380/10* (2013.01)

(58) Field of Classification Search
CPC ... G06F 3/012; G06F 27/017; H04N 5/23212; H04N 13/0022
See application file for complete search history.

(56) References Cited

U.S. PATENT DOCUMENTS

| | | |
|---|---|---|
| 2002/0099257 A1 | 7/2002 | Parker et al. |
| 2004/0100419 A1 | 5/2004 | Kato et al. |
| 2008/0199049 A1 | 8/2008 | Daly |
| 2010/0066832 A1* | 3/2010 | Nagahara ............. G02B 7/1822 348/148 |
| 2011/0227717 A1* | 9/2011 | Kumon ................. G02B 27/01 340/441 |
| 2014/0176425 A1* | 6/2014 | Bae ....................... G06F 3/0485 345/156 |
| 2015/0279102 A1* | 10/2015 | Fleck .................... G06T 19/006 345/419 |
| 2015/0293362 A1* | 10/2015 | Takahashi ............. G02B 27/02 348/47 |
| 2017/0176748 A1* | 6/2017 | Kim ................... G02B 27/0172 |
| 2017/0254659 A1* | 9/2017 | Fukumoto ............. B60K 35/00 |
| 2018/0285666 A1* | 10/2018 | Nishino ................. G06F 3/013 |

FOREIGN PATENT DOCUMENTS

| | | |
|---|---|---|
| CN | 102902466 | 1/2013 |
| EP | 3358839 | 8/2018 |
| JP | 2004343622 | 12/2004 |

OTHER PUBLICATIONS

"Office Action of Europe Counterpart Application", dated May 25, 2020, p. 1-p. 6.

* cited by examiner

IMAGE STABILIZATION METHOD AND ELECTRONIC DEVICE USING THE IMAGE STABILIZATION METHOD

CROSS-REFERENCE TO RELATED APPLICATION

This application claims the priority benefit of China application serial No. 201610395537.1, filed on Jun. 6, 2016. The entirety of the above-mentioned patent application is hereby incorporated by references herein and made a part of specification.

BACKGROUND OF THE INVENTION

Field of the Invention

The disclosure relates to an image stabilization technology and, more specifically, to an image stabilization method and an electronic device using the image stabilization method.

Description of the Related Art

With the popularity of mobile display devices, the mobile display devices are used anytime, anywhere, even on a moving vehicle. However, the moving vehicle is under an unstable circumstance, the user does not easy to focus on the display. Consequently, eyes easily get tired. Moreover, dizzy or even high intraocular pressure occurs. If the user wears a head-mounted display on a vehicle, the uncomfortable feelings for a user may be worse.

BRIEF SUMMARY OF THE INVENTION

According to an aspect of the invention, an image stabilization method adapted to an electronic device is provided. The electronic device includes at least a display and at least a connection interface. The connection interface is connected to the detector. The detector is used for detecting environmental information. The image stabilization method comprises: receiving a detecting signal from the detector; and performing an image stabilization procedure corresponding to a visual dislocation event according to the detecting signal. The visual dislocation event refers to a change of a relative position between the viewer and the display from a first position to a second position. The image stabilization procedure includes: changing an image extracting region from a first region of an original image to a second region of the original image according to the detecting signal; and displaying a second display image in the second region on the display. The second region is shifted by an offset distance in an offset direction relative to the first region.

According to another aspect of the invention, an electronic device comprises: a display; at least a connection interface for being connected with at least a detector; and a processor coupled to the display and the connection interface. The detector is configured for detecting environmental information. The processor is configured to receive a detecting signal from the detector and perform an image stabilization procedure corresponding to a visual dislocation event according to the detecting signal. The visual dislocation event refers to a change of a relative position between the viewer and the display from a first position to a second position. In the image stabilization procedure, an image displayed by the display is adjusted from a first display image in a first region of an original image to a second display image in a second region of the original image. A locating point in the second display image is shifted by an offset distance in an offset direction relative to the locating point in the first display image.

In sum, in embodiments of the disclosure, the detector is used for detecting the environmental information. The image stabilization procedure corresponding to the visual dislocation event is performed according to the detecting signal output from the detector. The visual dislocation event refers to a change of the relative position between the user and the display. In the image stabilization procedure, the image displayed on the display is automatically adjusted by shifting one locating point in the image by an offset distance in the offset direction. Thus, users would not feel so uncomfortable in viewing the image when the user's body or the display shakes.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

Figure 1:
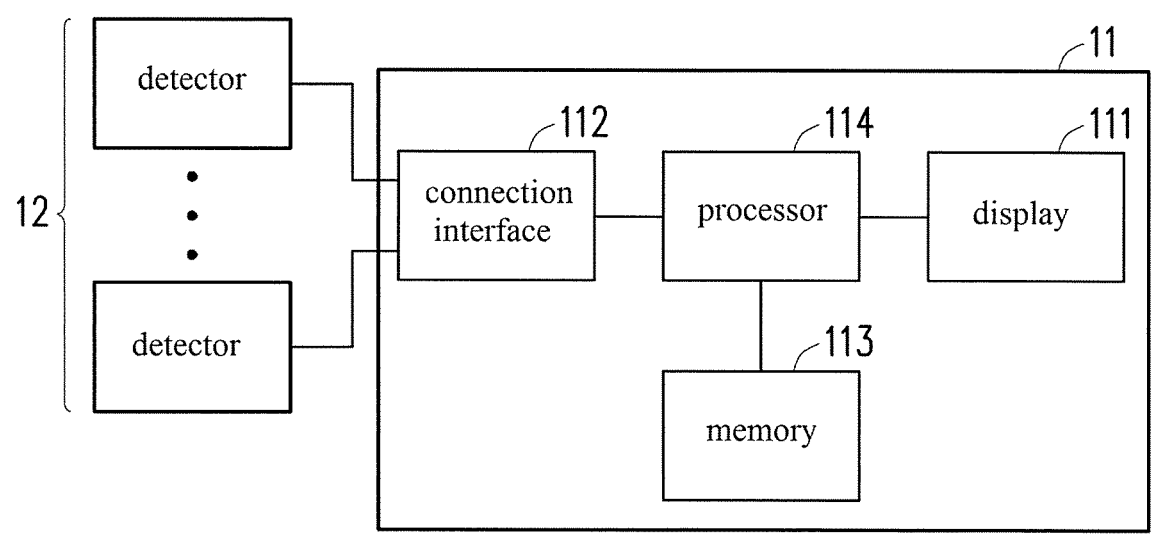
FIG. 1 is a schematic diagram showing an image stabilization system in an embodiment.

FIG. 1 is a schematic diagram showing an image stabilization system in an embodiment.

Please refer to FIG. 1. An image stabilization system 10 includes an electronic device 11 and a detector 12. The electronic device 11 includes a display 111, a connection interface 112, a memory 113, and a processor 114. In the embodiment, the display 111 is, but not limited to, a liquid crystal display (LCD), a light-emitting diode (LED) display, an organic light emitting display (OLED), or an electrophoretic display (EPD).

The connection interface 112 is connected to the detector 12. The number of the connection interfaces 112 is one or more. When the number of the connection interface 112 is more than one, the type of the connection interfaces 112 is the same or various to each other. The connection interface 112 includes a wired and/or wireless and supports wired and/or wireless communication standards, respectively.

In an embodiment, the connection interface 112 includes at least a wired connection interface. The connection interface 112 supports the inter-integrated circuit bus (I2C bus)

standard, the standard mobile imaging architecture (SMIA) standard, the mobile video interface (MPL) standard, the mobile video interface (MVI) standard, the mobile display digital interface (MDDI) standard, the peripheral component interconnect express (PCI Express) standard or the universal serial bus (USB) standard, which is not limited herein.

In an embodiment, the connection interface 112 includes at least a wireless connection interface. The connection interface 112 supports a global system for mobile communication (GSM) system, a personal handy-phone system (PHS), a code division multiple access (CDMA) system, a wireless fidelity (Wi-Fi) system, a worldwide interoperability for microwave access (WiMAX) system, a long term evolution (LTE) system, a near field communication (NFC) system or a blue-tooth system, which is not limited herein. In an embodiment, the wireless connection interface includes various communication circuits (such as an antenna circuit and a high-frequency circuit) to perform the wireless communication function.

In an embodiment, the memory 113 is any type of a fixed or removable random access memory (RAM), a read-only memory (ROM), or a flash memory, which is not limited herein. In an embodiment, the memory 113 includes other types of storage media.

The processor 114 is coupled to the display 111, the connection interface 112, and the memory 113. In an embodiment, the processor 114 is a single-core or multi-core central processing unit (CPU). In an embodiment, the processor 114 is other programmable microprocessor in general/special purpose, a digital signal processor (DSP), a programmable controller, an application specific integrated circuit (ASIC) or an embedded controller, which is not limited herein.

The detector 12 is configured to detect environmental information and output a detecting signal accordingly. The number of detectors 12 is one or more. The type of the detectors 12 is the same or various. In the embodiment, the detector 12 is external to the electronic device 11. However, in an embodiment, the detector 12 is a component of the electronic device 11.

In the embodiment, the processor 114 controls the display 111 to display an image. In embodiments, the image is a text, a symbol, a movie, or a picture. In an embodiment, the content of the image is stored in the memory 113. The image is played by the display 111 after applying an image processing procedure (such as decoding) to the image by the processor 114. The processor 114 receives a detecting signal from the detector 12 via the connection interface 112. At a particular time point, an image stabilization procedure corresponding to a visual dislocation event is performed by the processor 114 based on the detecting signal. In an embodiment, the processor 114 analyzes the environmental information detected by the detector 12 according to the detecting signal, and detects the visual dislocation event according to the analysis result of the environmental information. When a forthcoming or current visual dislocation event is detected, the corresponding image stabilization procedure is performed by the processor 114 immediately.

In the embodiment, the visual dislocation event refers to the change of the relative position between the viewer and the display 111. In an embodiment, when the viewer views a first display image on the display 111 in front of the display 111 and, the relative position between the viewer and the display 111 changes from a first position to a second position according to the movement of the viewer or the display 111. In an embodiment, when the relative position between the viewer and the display 111 is changing, the viewer feels that the display 111 is moved upward, downward, left, right, or in other direction relative to him or her. That is, when the visual dislocation event occurs, the viewer may feel that only the display 111 is moved.

Generally, the visual dislocation event is caused by a sudden shaking or wobbling of the viewer or the display 111. In an embodiment, the visual dislocation event is caused by different shaking (wobbling) frequencies, directions and/or magnitudes between the viewer and the display 111. The shaking or wobbling is not expected or controlled by the viewer. In an embodiment, on a moving vehicle (such as an automobile, a train, an airplane, and a MRT), the viewer or the display 111 shakes with the movement of the vehicle. In an embodiment, when the viewer is walking and using the electronic device 10, the viewer or the display 111 of the electronic device 10 shakes with the paces of the viewer.

When the visual dislocation event occurs, the viewer's eyes needs to move with the shaking or wobbling display 111 due to the change of the relative position between the viewer and the display 111. Therefore, if the visual dislocation events occur frequently, the viewer need to pay much attention to view the image displayed on the display 111. As a result, the viewer may feel dizzy or have a high intraocular pressure.

In the embodiment, when a forthcoming or current visual dislocation event is detected, the processor 114 adaptively adjusts the image displayed on the display 111 via the image stabilization procedure. In an embodiment, in the image stabilization procedure, the processor 114 adjusts the image displayed on the display 111 from first display image to a second display image. A locating point in the second display image is shifted by an offset distance in an offset direction relative to the locating point in the first display image. That is, when the viewer or the display 111 has a sudden shaking or wobbling, the image displayed on the display 111 is shifted by the offset distance in the offset direction to prevent great changes of the relative position between the viewer and the image displayed on the display 111. Therefore, even if the visual dislocation event occurs, the relative position between the viewer and the image displayed on the display 111 is kept constant or only slightly changed. Consequently, the viewer's eyes do not need to move with the shaking/vibrating display 111, which makes the viewer feel more comfortable.

Figure 2A:
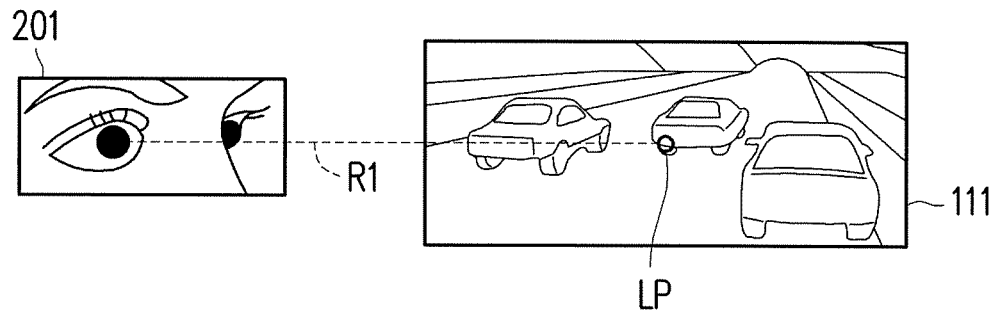
FIG. 2A to FIG. 2C are schematic diagrams showing an image stabilization procedure in an embodiment.
Figure 2B:
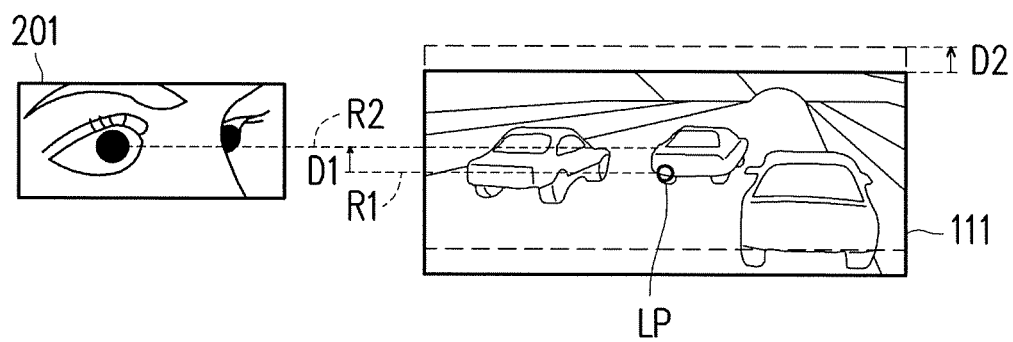
Figure 2C:
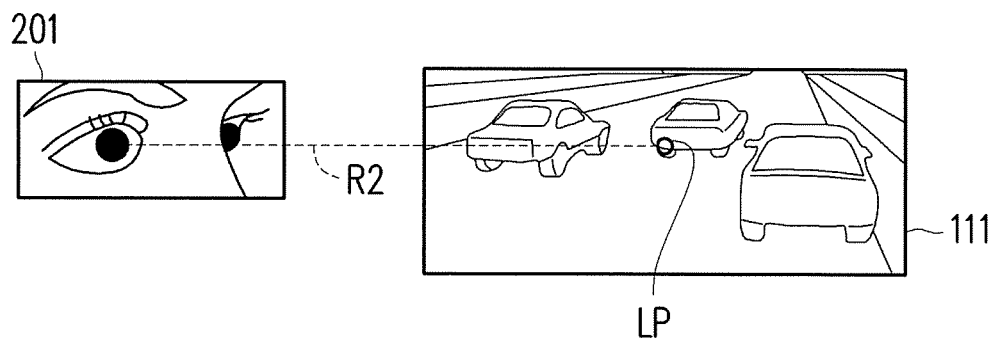

FIG. 2A to FIG. 2C are schematic diagrams showing an image stabilization procedure in an embodiment.

Please refer to FIG. 2A. In an embodiment, it is assumed that the first display image is displayed on the display 111 and the relative position between the viewer 201 and the display 111 is a first position that is represented by a dashed line R1. That is, one end of the dashed line R1 is aligned with eyes of the viewer 201 and the other end of the dashed line R1 is aligned with a locating point LP in the first display image. At the time, the locating point LP is located at an original position in the first display image.

Please refer to FIG. 2B. The processor 114 detects a visual dislocation event. The visual dislocation event refers to that the relative position between the viewer 201 and the display 111 changes from the first position to a second position represented by the dashed line R2. In the embodiment, one end of the dashed line R2 is also aligned with the eyes of the viewer 201, but the other end of the dashed line R2 moves upward by a distance D1 relative to the dashed line R1. That is, the visual dislocation event is considered as the upward movement of the viewer 201 relative to the display 111 by a distance D1 (or the downward movement of the display 111 relative to the viewer 201 by the distance D1). Thus, an image stabilization procedure is performed by the processor 114 to reduce the impact of the visual dislocation event on the viewer. In an embodiment, when the viewer 201 moves upward by the distance D1 relative to the display 111, the processor 114 is configured to synchronously move the image displayed by the display 111 upward by a distance D2. That is, the image displayed by the display 111 is adjusted to the second display image via the image stabilization procedure.

Please refer to FIG. 2C, when the visual dislocation event is detected, the second display image is displayed by the display 111. The locating point LP in the second display image is also shifted upward by the distance D2 relative to the locating point LP in the first display image to be align with the eyes of the viewer 201. That is, with the image stabilization procedure, even if a visual dislocation event occurs, the locating point LP is kept in alignment with the gazing direction of the viewer 201.

In the embodiment, the shifting direction of the image displayed by the display 111 is consistent with the shifting direction of the relative position between the viewer 201 and the display 111. In an embodiment, as shown in FIG. 2A to FIG. 2C, when the visual dislocation event occurs, the display 111 moves upward or downward relative to the viewer 201. Therefore, in the image stabilization procedure, the image displayed on the display 111 also moves upward or downward relative to the viewer 201 correspondingly. In an embodiment, the movement of the display 111 relative to the viewer 201 is considered as the movement of the display 111 in a y-axis direction. Then, in the image stabilization procedure, the image displayed on the display 111 also moves in the y-axis direction of the display 111. In an embodiment, the display 111 moves downward (that is, the display 111 moves in a negative y-axis direction) relative to the viewer 201 due to a visual dislocation event, the image displayed on the display 111 moves upward (that is, the image moves in a positive y-axis direction) relative to the viewer 201 in the image stabilization procedure, as shown in FIG. 2B. In an embodiment, when the display 111 moves upward (that is, the display 111 moves in the positive y-axis direction) relative to the viewer 201 due to the visual dislocation event, the image displayed on the display 111 moves downward relative to the viewer 201 in the image stabilization procedure (that is, the image moves in the negative y-axis direction).

In the embodiment, the processor 114 determines the shifting distance D2 (that is, the offset distance) of the image displayed on the display 111 according to the detecting signal. The distance D2 is positively correlated to the magnitude of the change in the relative position between the viewer 201 and the display 111. In the embodiment, the magnitude of the change in the relative position between the viewer 201 and the display 111 is represented by the distance D1, and the distance D2 is equal to the distance D1. However, in an embodiment, the distance D2 is approximate to (a little greater or less than) the distance D1.

In the embodiment, when the relative position between the viewer 201 and the display 111 is in the first position, the first display image is displayed by the display 111. When the relative position between the viewer 201 and the display 111 is in the second position, the second display image is displayed by the display 111. In an embodiment, one visual dislocation event corresponds to one shaking or wobbling. The visual dislocation event usually lasts for a little while. When the visual dislocation event occurs, the relative position between the viewer 201 and the display 111 changes from the first position to the second position. Then, when the visual dislocation event is over, the relative position between the viewer 201 and the display 111 changes from the second position back to the first position.

In other words, when the relative position between the viewer 201 and the display 111 changes from the second position to the first position. The processor 114 restores the image displayed by the display 111 to the first display image synchronously. Thus, during the occurrence of the visual dislocation event, even if the relative position between the viewer 201 and the display 111 changes continuously, the relative position between the viewer 201 and the image (or the locating point in the image) displayed by the display 111 is kept constant or only slightly changed.

In FIG. 2A to FIG. 2C, in the embodiment, the image displayed on the display 111 is moved upward/downward to keep the relative position between the viewer 201 and the image displayed on the display 111 unchanged via the image stabilization procedure. In other embodiment, the relative position between the viewer 201 and the image (or the locating point in the image) displayed by the display 111 is kept constant or only slightly changed by taking images in different regions of the original image.

Figure 3A:
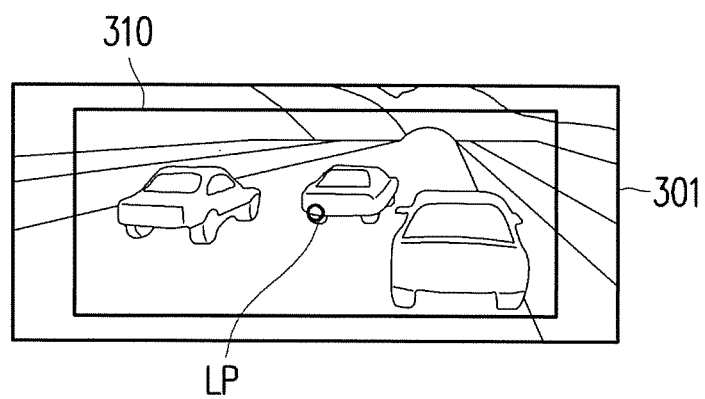
FIG. 3A to FIG. 3C are schematic diagrams showing an image stabilization procedure in an embodiment.

Please refer to FIG. 2A and FIG. 3A, before the image stabilization procedure is performed (or the visual dislocation event is detected), the processor 114 extracts the image in a region 310 of the original image 301 as the first display image. The first display image is displayed by the display 111. In an embodiment, the region 310 has the same size as the display area (screen) of the display 11. After the visual dislocation event shown in FIG. 2B is detected, the image stabilization procedure is performed by the processor 114.

Figure 3B:
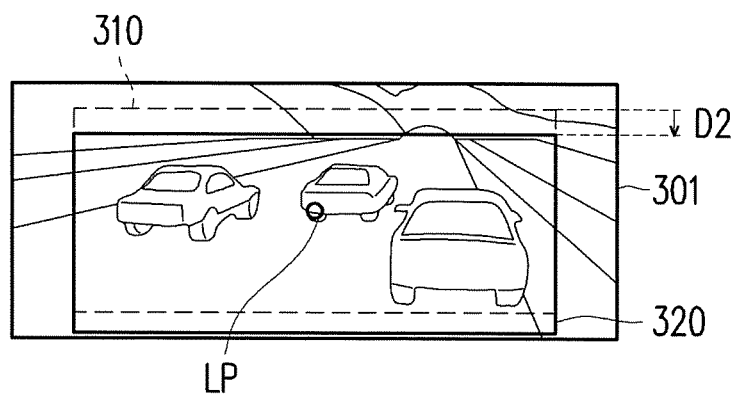

Please refer to FIG. 2B and FIG. 3B, in the image stabilization procedure, the processor 114 determines the shifting direction (that is, the offset direction) of the image (or the locating point in the image) and the shifting distance (that is, the offset distance) according to the detecting signal to position the region 320 in the original image 301. The region 320 and the region 310 have the same size. The region 320 is shifted in the offset direction by the offset distance (such as, the offset distance D2 in the negative y-axis direction) relative to the region 310.

Figure 3C:
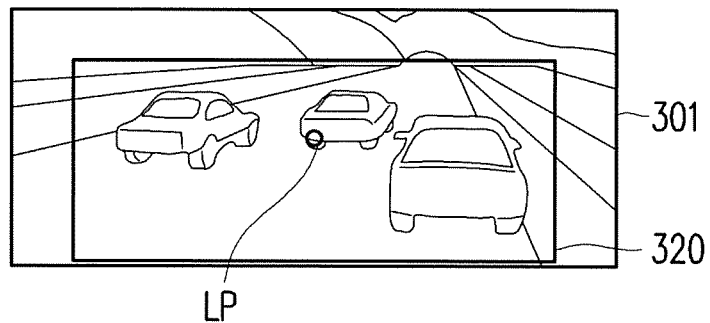

Please refer to FIG. 2C and FIG. 3C. After the region 320 is positioned, the processor 114 extracts the image in the region 320 from the original image 301 as the second display image. The second display image is displayed by the display 111. After the end of the visual dislocation event, the processor 114 extracts the image in the region 310 from the original image 301 as the first display image. The first display image is displayed by the display 111 again.

In an embodiment, the original image 301 is a dynamic or static image that is continuously played. Therefore, the images that are extracted from the region 310 and the region 320 of the original image 301 are also dynamic or static images continuously played.

For multiple visual dislocation events, the change of the relative position between the viewer 201 and the display 111 is considered as consecutively changes. The image stabilization procedure includes multiple adjustments onto the images displayed on the display 111 accordingly.

In an embodiment, the image stabilization procedure is not performed if the forthcoming or current visual dislocation event is not detected. In an embodiment, since the relative position between the viewer and the display does not change when the viewer and the display 111 move synchronously, the image stabilization procedure is not performed.

Figure 4:
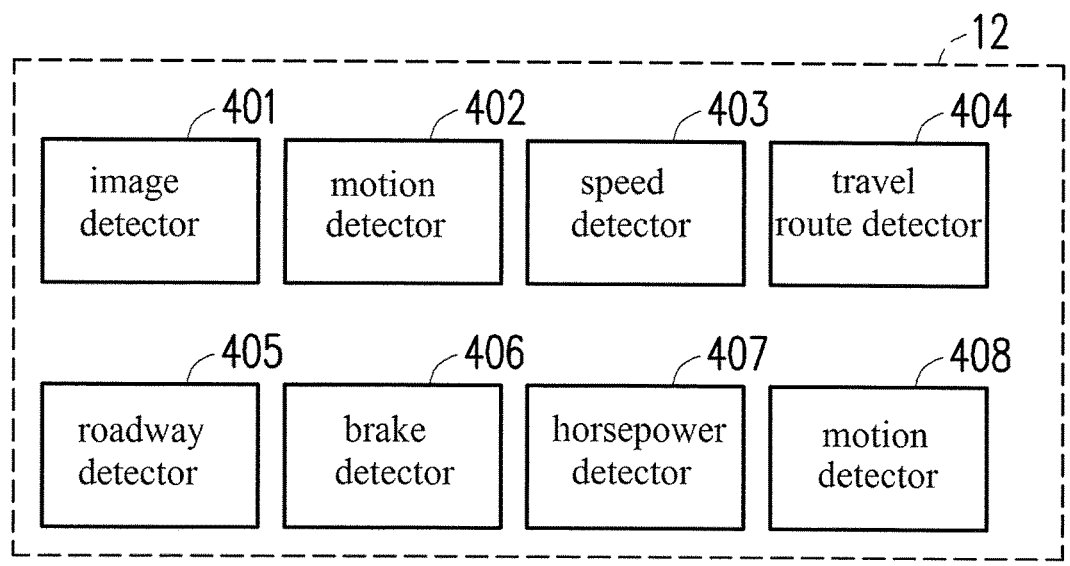
FIG. 4 is a block diagram showing a detector in an embodiment.

FIG. 4 is a block diagram showing a detector in an embodiment. Please refer to FIG. 4. The detector 12 includes at least one of an image detector 401, a motion detector 402, a speed detector 403, a travel route detector 404, a roadway detector 405, a brake detector 406, a horsepower detector 407 and a motion detector 408. In an embodiment, the number of any of the image detector 401, the motion detector 402, the speed detector 403, the travel route detector 404, the roadway detector 405, the brake detector 406, the horsepower detector 407 and the motion detector 408 is one or more.

In an embodiment, the image detector 401 and/or the motion detector 402 are configured at the display 111 or the electronic device 111 with the display 111. The image detector 401 is configured to detect face image information of the viewer. In an embodiment, the image detector 401 includes at least one lens. In an embodiment, the image detector 401 is a face image detector. The motion detector 402 is configured to detect movement information of the display 111. In an embodiment, the motion detector 402 includes at least one of an accelerometer sensor, a magnetic sensor, a gyro-sensor and a g-sensor, which is not limited herein. In an embodiment, the motion detector 402 is also called as a display motion detector. In an embodiment, the movement information includes information about the shaking/wobbling frequency, direction, and/or shaking/wobbling magnitude of the display 111.

Figure 5:
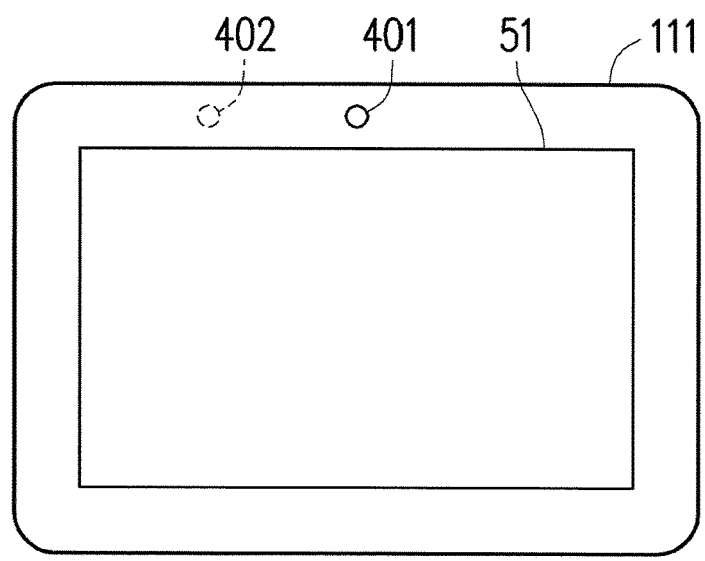
FIG. 5 is a schematic diagram showing a display in an embodiment.

FIG. 5 is a schematic diagram showing a display device in an embodiment. Please refer to FIG. 5. The image detector 401 is disposed at a side portion of a screen 51 of the display 111. Thus, the image detector 401 is capable of capturing the face image of the viewer in front of the display 111 and outputting a corresponding detecting signal. In an embodiment, the processor 114 obtains facial feature information, such as eyeball position(s) and/or pupil size of the viewer according to the detecting signal output by the image detector 401. The processor 114 analyses the detecting signal output by the image detector 401 to determine whether a visual dislocation event occurs. In an embodiment, when the processor 114 determines that the eyeball position(s) of the viewer changes, it means that the visual dislocation event occurs. In an embodiment, the processor 114 analyses the detecting signal output by the image detector 401 to determine parameters used for adjusting the image in the image stabilization procedure.

The motion detector 402 is disposed at the display 111 or disposed inside the electronic apparatus 11 which includes the display 111. Thus, the motion detector 402 detects the wobbling or shaking of the display 111 and outputs a corresponding detecting signal. The processor 114 analyses the detecting signal output by the image detector 402 to determine whether a visual dislocation event occurs or determine parameters used for adjusting the image in the corresponding image stabilization procedure.

Please refer to FIG. 4. In an embodiment, the speed detector 403, the travel route detector 404, the roadway detector 405, the brake detector 406, the horsepower detector 407 or the motion detector 408 is disposed on a vehicle to detect the environmental information of the display 111. The speed detector 403 is configured to detect the speed information of the vehicle. The travel route detector 404 is configured to detect the route information of the vehicle. The roadway detector 405 is configured to detect the road condition information. The brake detector 406 is configured to detect the brake information. The horsepower detector 407 is configured to detect the horsepower information. The motion detector 408 is configured to detect the movement information of the vehicle.

In an embodiment, at least one of the speed detector 403 and the travel route detector 404 is connected to a navigation system of the vehicle. At least one of the speed information and the route information is provided by the navigation system. In an embodiment, the roadway detector 405 includes at least one of a road image detector, an infrared ray detector, an ultrasonic transceiver, a millimeter radar and a laser detector. The road condition information includes at least one of the road image information of the road ahead and the obstacle information of the road ahead, which is not limited herein. In an embodiment, the brake detector 406 and the horsepower detector 407 are connected to a powertrain system of the vehicle. In an embodiment, the motion detector is connected to at least one of a tire and a shock-absorber of the vehicle.

Figure 6:
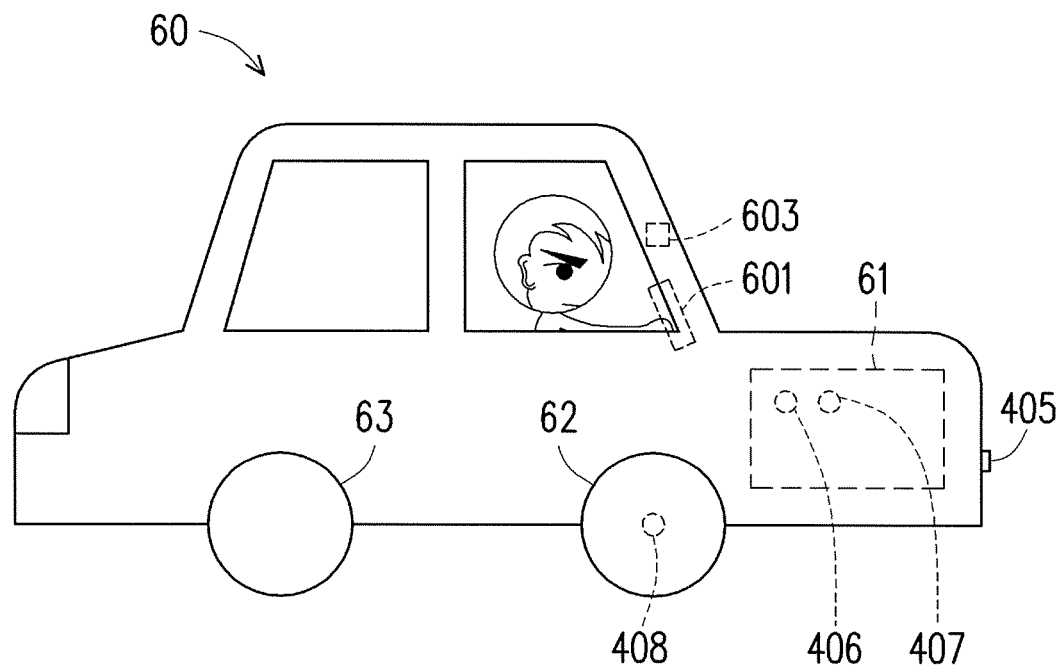
FIG. 6 is a schematic diagram showing a vehicle in an embodiment.

FIG. 6 is a schematic diagram showing a vehicle in an embodiment. Please refer to FIG. 6. In an embodiment, the speed detector 403 or the travel route detector 404 is integrated in a navigation device 601 of a vehicle. The navigation device 601 is configured to execute a navigation system. According to navigation information from the navigation system, the speed detector 403 detects the current speed information of the vehicle 60, and the travel route detector 404 detects the route information related to the navigation route ahead of the vehicle 60 in the navigation information. According to the detecting signals output by the speed detector 403 and the travel route detector 404, the processor 114 obtains useful information about the speed, the direction, the time point of turning/changing lanes, the tilt of the vehicle body in turning.

In an embodiment, the roadway detector 405 is disposed at the front of the vehicle 60. In an embodiment, the roadway detector 405 is the road image detector 603 disposed inside the vehicle 60. In an embodiment, the road image detector 603 is a traveling data recorder. The roadway detector 405 detects the road image information or the obstacle information ahead of the vehicle 60. In an embodiment, the roadway detector 405 detects the road condition ahead of the vehicle 60 and outputs a corresponding detecting signal. According to the detecting signal of the roadway detector 405, the processor 114 obtains the information about the road condition (for example, whether there are bumps or hollows on the road ahead) ahead of the vehicle 60, the states of the traffic signals, the distance between the vehicle 60 and the front vehicle, the distance between the front obstacle and the vehicle 60 or the time point when the vehicle 60 hits the obstacle, which is not limited herein.

In FIG. 6, the powertrain system of the vehicle 60 is shown via a dashed box 61. In an embodiment, the powertrain system includes a brake unit (not shown) and an engine unit (not shown). The brake unit is configured to take a brake the vehicle 60. The engine unit is configured to drive the vehicle 60 to go forward or backward. In an embodiment, the brake detector 406 is connected to the brake unit of the vehicle 60 to detect instant brakes of the vehicle 60. In an embodiment, the horsepower detector 407 is connected to the engine unit of the vehicle 60 to detect instant changes of the horsepower of the vehicle 60, such as, a rotational speed. According to the detecting signal output by the brake detector 406, the processor 114 obtains the brake information of the vehicle 60. According to the detecting signal output by the horsepower detector 407, the processor 114 obtains the horsepower information of the vehicle 60. In an embodiment, the speed detector 403 is connected to the powertrain system of the vehicle 60 to detect the speed of the vehicle 60.

In an embodiment, the motion detector 408 includes an accelerometer sensor, a magnetic sensor, a gyro-sensor, a g-sensor or a pressure sensor, which is not limited herein. In an embodiment, the motion detector 402 is also called as a vehicle motion detector. In an embodiment, the motion detector 408 is disposed at or connected to at least one of the front wheel 62 of the vehicle 60 and the shock-absorber inside the vehicle 60. In such a way, the detecting signal output from the motion detector 408 immediately reflects whether the vehicle 60 is in shaking or wobbling, as well as the direction, magnitude, and frequency of the shaking or wobbling. In embodiments, the motion detector 408 is disposed at the rear wheel 63 or at any position of the vehicle 60.

In FIG. 6, in the embodiment, the processor 114 detects whether a visual dislocation event occurs and/or determines parameters used for adjusting the images in the image stabilization procedure according to the detecting signals output from some of or all of the detectors that are disposed on the vehicle 60. In an embodiment, the processor 114 determines whether a visual dislocation event occurs, the time point of occurrence of the visual dislocation event, the changes of direction and/or magnitude in the relative position between the viewer and the display 111 on the vehicle 60 when the visual dislocation event occurs, and the offset direction and the offset distance of the image (or the locating point in the image) in the image stabilization procedure according to the speed information, the route information, the road condition information, the brake information, the horsepower information or the movement information of the moving vehicle 60. In another embodiment in FIG. 6, the processor 114 analyses the detecting signals output by the detectors disposed on the display 111 and the detectors disposed the vehicle 60, to detect whether a visual dislocation event occurs and determine parameters used for adjusting the image in the image stabilization procedure.

In an embodiment, the adjustment of the images in the image stabilization procedure includes the adjustment on the image resolution, the image projection distance and/or the image size (enlargement/reduction), which is not limited herein and depends on the requirement. In an embodiment, when the visual dislocation event occurs too frequently, the resolution of at least partial of the images that are displayed by the display 111 is reduced. Thus, the burden on the viewer's eyes due to the too sharp of the images is relieved. In an embodiment, the shifting direction of the image (or the locating point in the image) is various with the condition that the relative position between the viewer and the image displayed on the display 111 is kept unchanged.

Figure 7:
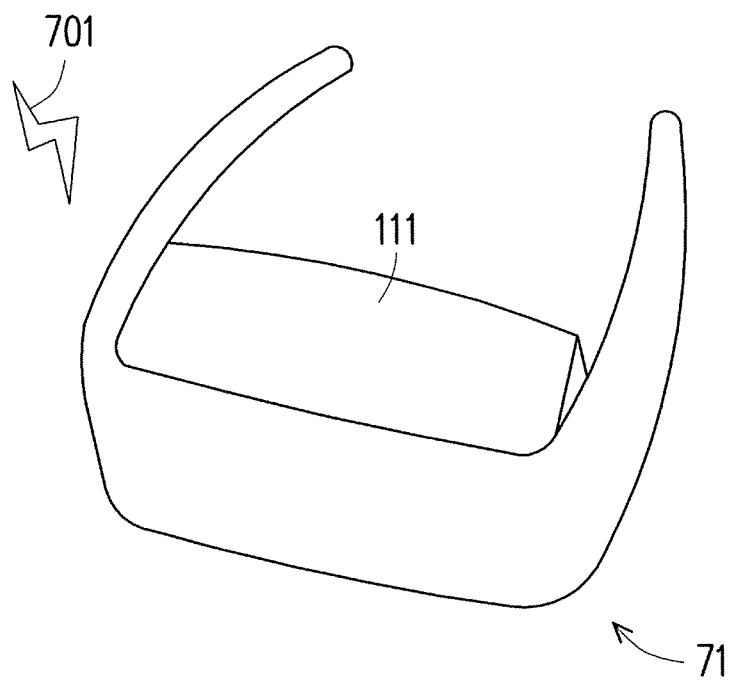
FIG. 7 is a schematic diagram showing an electronic device in an embodiment.

FIG. 7 is a schematic diagram showing an electronic device in an embodiment. Please refer to FIG. 7. In an embodiment, an electronic device 11 is a head-mounted display device 71, such as a virtual reality glass, an augmented reality glass and a smart mixed-reality glass. The head-mounted display device 71 at least includes the display 111, the connection interface 112, the memory 113, and the processor 114 mentioned in the embodiment of FIG. 1. The processor 111 of the head-mounted display device 71 receives the detecting signals from one or more of the detectors that are configured at the head-mounted display device 71 or on the vehicle 60 in FIG. 6 wiredly or wirelessly. In an embodiment, the processor 114 of the head-mounted display device 71 has a wireless connection with at least one detector that is configured on the vehicle 60 via the connection interface 112 to receive the detecting signal from the paired detector based on the wireless transmission 701. In an embodiment, the processor 114 of the head-mounted display device 71 has a wired connection with at least one detector that is configured on the vehicle 60 via the connection interface 112 to receive the detecting signal from the paired detector based on the wired transmission. Then, the processor 114 of the head-mounted display device 71 analyses the received detecting signals to perform the image stabilization procedure. Related descriptions are mentioned above, which is not repeated here.

In an embodiment, when a user wears the head-mounted display device 71 to view the images displayed on the display 111 of the head-mounted display device 71 on the moving vehicle 60, with the image stabilization procedure, the discomfort feeling of the user caused by the shaking or wobbling of the moving vehicle 60 is reduced. In the embodiment in FIG. 7, the electronic device 11 is a head-mounted display device. However, in embodiments, the electronic device 11 is other mobile display devices, such as a vehicle-mounted display, a smart dashboard, a navigation device, a smart phone, a tablet computer, and a notebook computer, which is not limited herein.

In an embodiment, the electronic device 11 in FIG. 1 is implemented in combination with the vehicle (such as, the vehicle 60). In the embodiment of FIG. 6 and FIG. 7, the images are displayed by the head-mounted display device 71 via the display 111. In an embodiment, the processor 114 is configured at the head-mounted display device 71 or configured on the vehicle 60. In FIG. 7, in an embodiment, the head-mounted display device 71 is replaced by a display (such as a vehicle-mounted display) movably or fixed to the vehicle.

Figure 8:
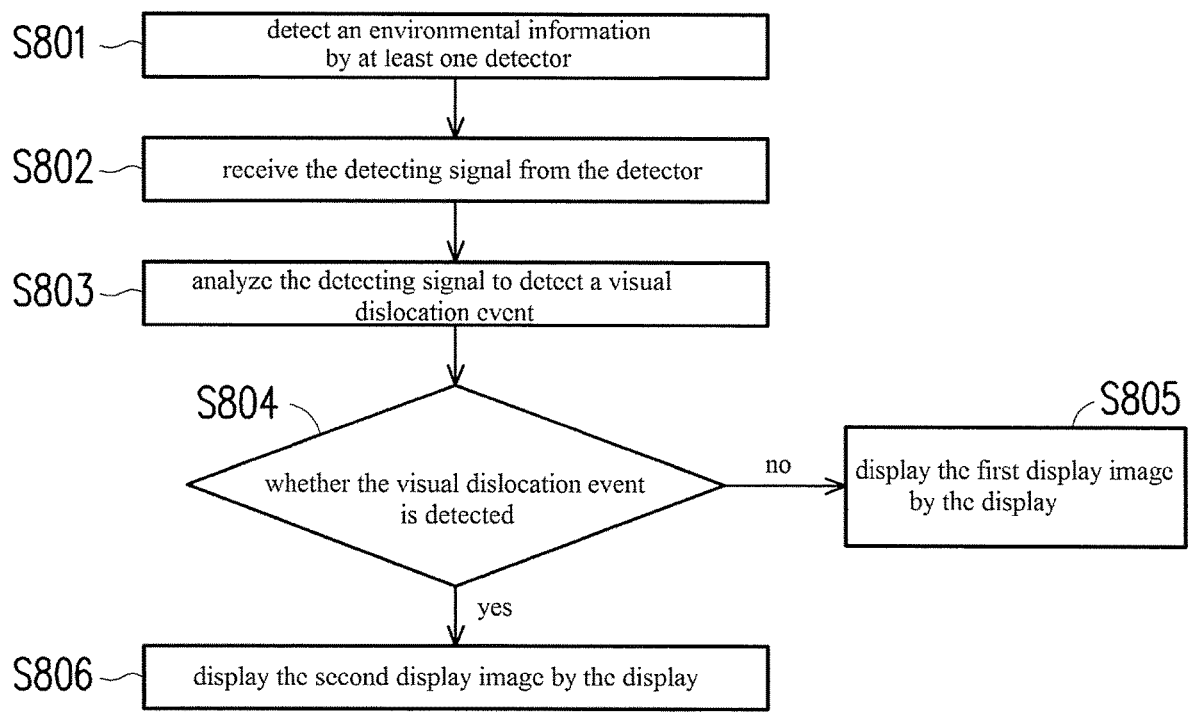
FIG. 8 is a flowchart of an image stabilization method in an embodiment.

FIG. 8 is a flowchart of an image stabilization method in an embodiment. Please refer to FIG. 8. In step S801, at least one detector detects environmental information and output a corresponding detecting signal. In step S802, the detecting signal is received from the detector. In step S803, the detecting signal is analyzed to detect a visual dislocation event. In step S804, whether the visual dislocation event is detected is determined. If the visual dislocation event is not detected, in step S805, the first display image is displayed by the display. If the visual dislocation event is detected, in step S806, the image stabilization procedure is performed and the second display image is displayed by the display. The locating point in the second display image is shifted by an offset distance in an offset direction relative to the locating point in the first display image. Thus, with the image stabilization procedure, the relative position between the viewer and the image displayed on the display 111 is kept constant or only slightly changed during the occurrence of the visual dislocation event. In an embodiment, after the steps S805 and S806, the step S801 is repeated.

Figure 9:
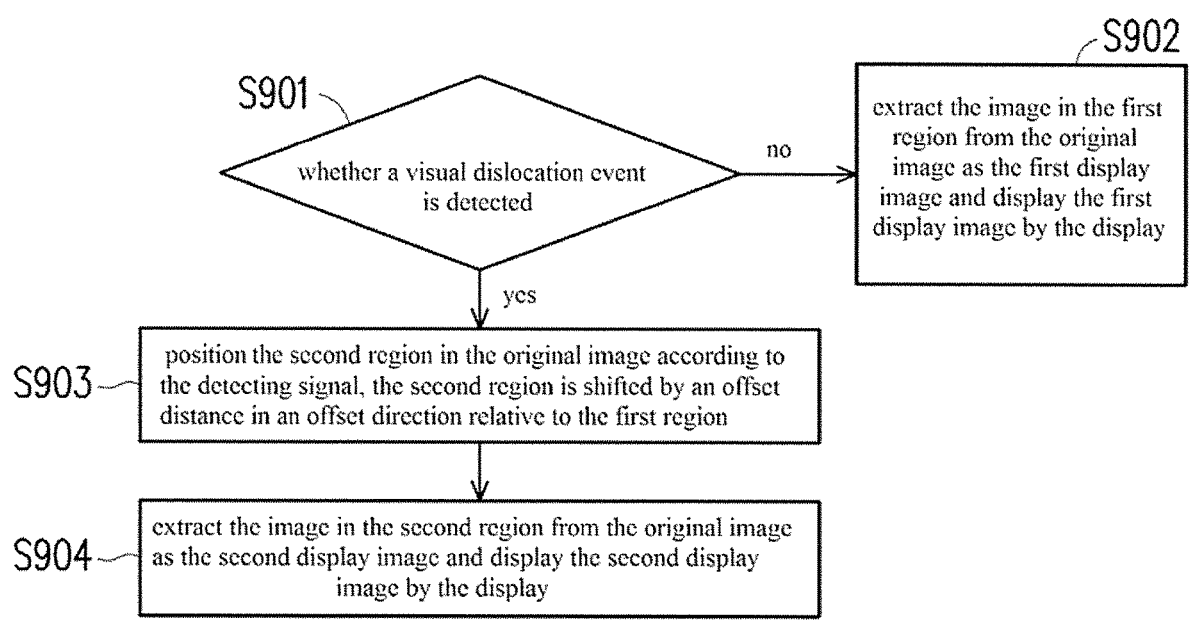
FIG. 9 is a flowchart of an image stabilization method in an embodiment.

FIG. 9 is a flowchart of an image stabilization method in an embodiment. Please refer to FIG. 9. In step S901, whether a visual dislocation event is detected is determined. If the visual dislocation event is not detected, the image extracting region is a first region in the original image. In step S902, the image in the first region is extracted from the original image as the first display image, and the first display image is displayed by the display. If the visual dislocation event is detected, the image extracting region is changed to a second region of the original image from the first region of the original image. In step S903, the second region is positioned in the original image according to the detecting signal. The second region is shifted by an offset distance in an offset direction relative to the first region. In step S904, the image in the second region is extracted from the original image as the second display image and the second display image is displayed by the display.

Figure 10:
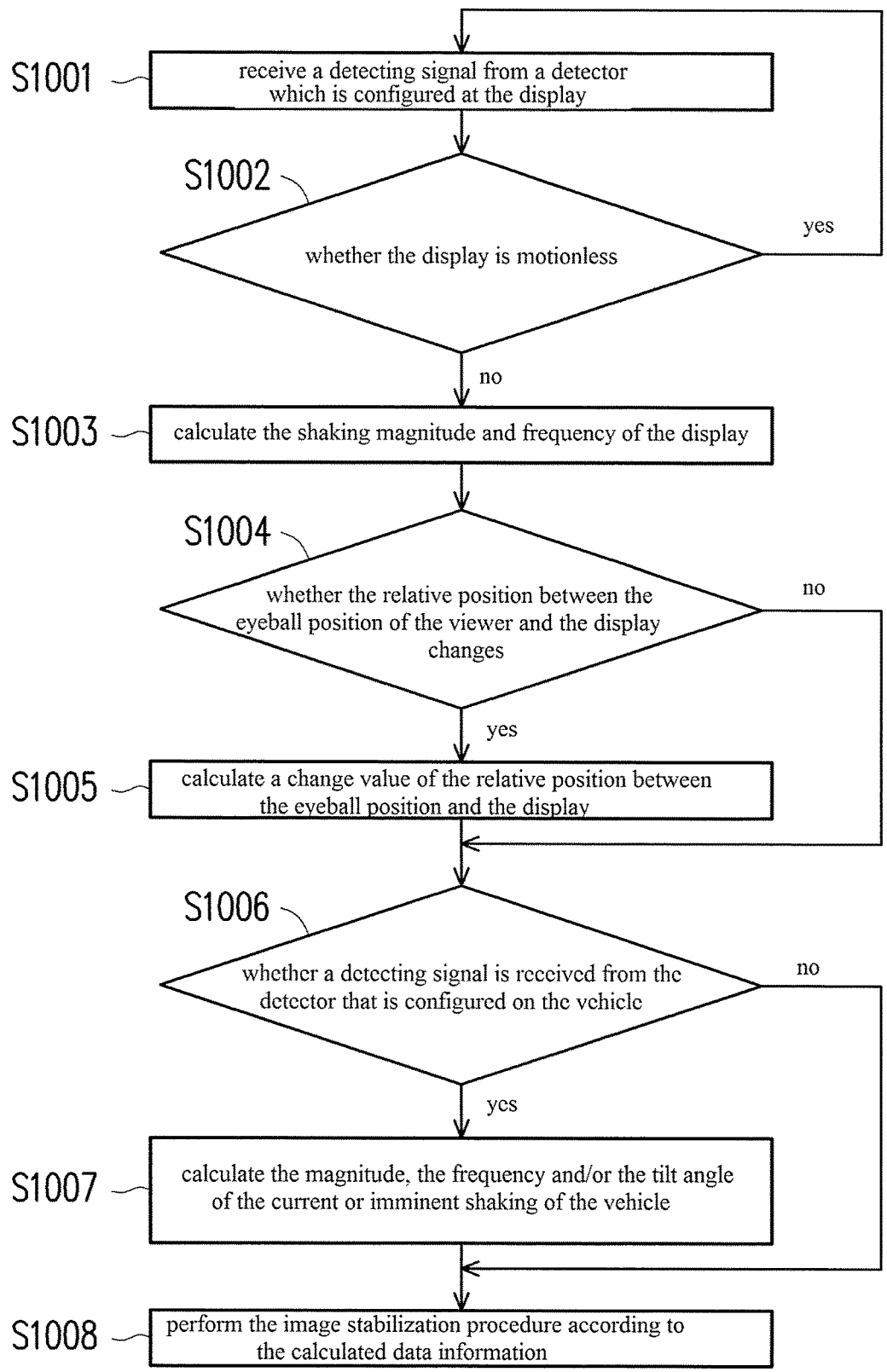
FIG. 10 is a flowchart of an image stabilization method in an embodiment.

FIG. 10 is a flowchart of an image stabilization method in an embodiment. Please refer to FIG. 10. In step S1001, a detecting signal is received from the detector which is configured at the display. In step S1002, whether the display is motionless is determined. If the display does not move, it is determined that the visual dislocation event does not occur, then back to step S1001. If the display moves, it indicates that the visual dislocation event may occur, and then go to step S1003. In step S1003, the shaking magnitude, frequency or direction of the display is calculated. In step S1004, whether the relative position between the eyeball position of the viewer and the display changes is determined. If the relative position between the eyeball position of the viewer and the display changes, in step S1005, a change value of the relative position between the eyeball position of viewer and the display is calculated. If the relative position between the eyeball position of the viewer and the display does not change, then go to step S1006. In step S1006, whether a detecting signal is received from the detector that is configured on the vehicle is determined. In an embodiment, whether a preset detecting signal is received instantly from the navigation system, the powertrain system, the suspension system or the traveling data recorder of the vehicle is determined. If the preset detecting signal is received instantly from the navigation system, the powertrain system, the suspension system or the traveling data recorder of the vehicle, then, in step S1007, the magnitude, the frequency or the tilt angle of the current or forthcoming shaking of the vehicle is calculated. If the preset detecting signal is not received instantly from the navigation system, the powertrain system, the suspension system or the traveling data recorder of the vehicle, then go to step S1008. In step S1008, the image stabilization procedure is performed according to the calculated data information.

Details for the steps in FIG. 8 to FIG. 10 are described above. The steps in FIG. 8 to FIG. 10 are implemented by a plurality of program codes or circuits, which is not limited herein. In an embodiment of FIG. 1, a plurality of software modules are configured in the memory 113. When the processor 114 reads and loads the software modules from the memory 113, the processor 114 performs the various functions mentioned above. In another embodiment of FIG. 1, the processor 114 includes a plurality of hardware circuits that are configured to perform the various functions mentioned above. In an embodiment, the hardware circuits includes a signal-analyzing circuit configured to analyze the detecting signal to detect the visual dislocation event, an image-adjusting circuit configured to adjust the display images and an image-providing circuit configured to provide the display image for the display to display, which is not limited herein. In an embodiment, the method in embodiments of FIG. 8 to FIG. 10 can be used in combination or separately, which is not limited herein.

In sum, in embodiments, the detectors are used for detecting the environmental information. When the images are displayed by the display, the forthcoming or current visual dislocation event is detected according to the detecting signals output from the detectors, and the image stabilization procedure is performed accordingly. The visual dislocation event refers to that the relative position between the viewer and the display changes. In the image stabilization procedure, the image displayed by the display is adjusted to keep the relative position between the viewer and the image displayed on the display unchanged. Thus, users would not feel so uncomfortable in viewing the image when the user's body or the display shakes.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. An image stabilization method, adapted to an electronic device including at least a display and at least a connection interface, the connection interface is connected to one or more detectors including an image detector mounted on the display and configured to detect face image information of a viewer, the image stabilization method comprising:
  receiving detecting signals from the one or more detectors including the image detector;
  detecting a visual dislocation event by obtaining a change comprising an offset distance and an offset direction of a relative position between the viewer and the display from a first position to a second position according to the detecting signals from the image detector; and
  performing an image stabilization procedure in response to the detecting of the visual dislocation event which is detected according to the detecting signals,
  wherein the image stabilization procedure includes:
  changing an extracted image region from a first region of an original image to a second region of the original image using electronic/digital cropping of the original image in response to the change of the relative position between the viewer and the display from the first position to the second position, the second cropped region is shifted by a distance substantially equal to the offset distance in the offset direction in the original image relative to the first region; and
  displaying the second cropped region on the display in response to the visual dislocation event being detected to provide a corresponding image stabilization, wherein a locating point in the original image aligned with a gazing direction of the viewer is kept in alignment with the gazing direction of the viewer after said detecting of the visual dislocation event and displaying the second cropped region on the display.

2. The image stabilization method according to claim 1, wherein the offset direction is consistent with a direction in which the relative position changes.

3. The image stabilization method according to claim 1, wherein the image stabilization procedure further comprises:
  determining the offset distance according to the detecting signal, wherein the offset distance is positively correlated to a magnitude of the change in the relative position.

4. The image stabilization method according to claim 1, wherein the image stabilization procedure further comprises:
  establishing a wireless pairing or a wired connection with the one or more detectors via the connection interface; and
  receiving the detecting signal from a pair detector via a wireless transmission or receiving the detecting signal from a connected detector via a wired transmission.

5. An electronic device comprising:
  a display;
  at least a connection interface;
  an image detector, connected to the connection interface and configured to detect environmental information;

at least one of a speed detector, a travel route detector, a roadway detector, a brake detector, a horse power detector and a motion detector, connected to the connection interface and configured to detect the environmental information; and a processor, coupled to the display and the at least a connection interface, and configured to receive a plurality of detecting signals from the image detector and the at least one of the speed detector, the travel route detector, the roadway detector, the brake detector, the horse power detector and the motion detector, detect a visual dislocation event by obtaining a change comprising an offset distance and an offset direction of a relative position between the viewer and the display from a first position to a second position according to the detecting signals, and perform an image stabilization procedure in response to the detecting of the visual dislocation event which is detected according to the detecting signals, wherein the image stabilization procedure comprises to change an extracted image region from a first region of an original image to a second region of the original image using electronic/digital cropping of the original image in response to the change of the relative position between the viewer and the display from the first position to the second position, and shift the second cropped region by a distance substantially equal to the offset distance in the offset direction in the original image relative to the first region, wherein the display displays the second cropped region on the display in response to the visual dislocation event being detected to provide corresponding image stabilization, wherein a locating point in the original image aligned with a gazing direction of the viewer is kept in alignment with the gazing direction of the viewer after said detecting of the visual dislocation event and displaying the second cropped region on the display.

6. The electronic device according to claim 5, wherein the offset direction is consistent with a direction in which the relative position changes.

7. The electronic device according to claim 5, wherein in the image stabilization procedure, the processor is further configured to determine the offset distance according to the detecting signal, the offset distance is positively correlated to a magnitude of the change in the relative position.

8. The electronic device according to claim 5, wherein the processor is further configured to establish a wireless pairing or a wired connection with one or more detectors via the connection interface, and to receive the detecting signal from a paired detector via a wireless transmission or to receive a detecting signal from the connected detector via a wired transmission.

* * * * *